(12) United States Patent
Bato et al.

(10) Patent No.: US 11,466,785 B2
(45) Date of Patent: Oct. 11, 2022

(54) WATER DIVERTER APPARATUS AND METHOD

(71) Applicant: Wellis Magyarorszag Zrt., Budapest (HU)

(72) Inventors: Peter Bato, Dabas-Sari (HU); Robert Karacsony, Jaszbereny (HU); Arpad Jacso, Abony (HU)

(73) Assignee: Wellis Magyarorszag Zrt., Budapest (HU)

( * ) Notice: Subject to any disclaimer, the term of this patent is extended or adjusted under 35 U.S.C. 154(b) by 0 days.

(21) Appl. No.: 17/291,168

(22) PCT Filed: Oct. 24, 2019

(86) PCT No.: PCT/HU2019/000032
§ 371 (c)(1),
(2) Date: May 4, 2021

(87) PCT Pub. No.: WO2020/095075
PCT Pub. Date: May 14, 2020

(65) Prior Publication Data
US 2022/0074509 A1 Mar. 10, 2022

(30) Foreign Application Priority Data

Nov. 9, 2018 (HU) .................................. P1800378

(51) Int. Cl.
*F16K 11/00* (2006.01)
*F16K 11/052* (2006.01)
(Continued)

(52) U.S. Cl.
CPC .......... *F16K 11/052* (2013.01); *F16K 11/076* (2013.01); *F16K 11/085* (2013.01)

(58) Field of Classification Search
CPC .............................. F16K 11/076; F16K 11/085
See application file for complete search history.

(56) References Cited

U.S. PATENT DOCUMENTS 3,040,776 A 6/1962 Russell
4,635,674 A 1/1987 Bajka
(Continued)

OTHER PUBLICATIONS

European Patent Office, International Search Report in PCT Application No. PCT/HU2019/000032, dated Feb. 6, 2020 (3 pgs.).
(Continued)

*Primary Examiner* — Kevin R Barss
(74) *Attorney, Agent, or Firm* — Wood Herron & Evans LLP

(57) ABSTRACT

The invention is a water diverter apparatus comprising—a housing (10) having an inlet section (12) and two outlet sections (14), with a separation angle of less than 180° between the outlet sections (14), and—a flow directing member that can be adjusted by rotation about a shaft (18) supported in the housing (10). The apparatus is characterised in that—the flow directing member is a closing member (16) arranged downstream of the shaft (18), the closing member (16) being connected with the shaft (18) via a spacer (17) and having a closing surface arranged transversely to a flow direction, the closing member (16) having a first position adapted to close one of the outlet sections (14), a second position adapted to close the other outlet section (14), and a third position between the first and the second positions, adapted to allow water to flow into both outlet sections (14). The invention is furthermore a method for operating a water diverter apparatus.

9 Claims, 3 Drawing Sheets

(51) Int. Cl.
 F16K 11/076 (2006.01)
 F16K 11/085 (2006.01)

(56) References Cited

U.S. PATENT DOCUMENTS 5,320,141 A 6/1994 Keiper
5,846,104 A * 12/1998 Corcoran ............... B63H 11/10
 441/71
6,289,913 B1 9/2001 Babin

OTHER PUBLICATIONS

European Patent Office, International Preliminary Report On Patentability in PCT Application No. PCT/HU2019/000032, dated Jan. 13, 2021 (11 pgs.).

* cited by examiner

WATER DIVERTER APPARATUS AND METHOD

This application claims priority, under Section 371, and/or as a continuation under Section 120, to PCT Application No. PCT/HU2019/000032, filed on Oct. 24, 2019, which claims priority to Hungarian Application No. P1800378, filed on Nov. 9, 2018.

TECHNICAL FIELD

The invention relates to a water diverter apparatus that is suited for installation, for example, in massage pools, tubs or shower enclosures such that it supplies water to water injector openings or nozzles disposed therein, while controlling the direction and/or rate of the water flow. The invention also relates to a method for operating the water diverter apparatus.

BACKGROUND ART

Prior-art water diverters that are currently commercially available usually comprise a T-shaped arrangement because switching is performed manually at the edge of pools or tubs, usually by turning a switching element. Therefore, water has to be passed from the bottom of the pool or tub all the way up to its upper edge, and from there to the various nozzles and water inlet openings. Manual control thus poses a number of restrictions on the configuration of water diverters, because water can typically be guided at the edges of pools or tubs by applying T-shaped devices, furthermore the water has to be guided back again to the nozzles that are often situated at the bottom of the pool or tub. In T-shaped devices the 90-degree diversion of water causes significant pressure loss, but passing the water from the bottom of the pool upwards to the edge of the pool or tub, and back again to the bottom thereof also introduces serious flow losses.

The prior art includes other apparatuses adapted for controlling the flow direction or flow rate of a flowing medium.

An apparatus adapted for controlling water flow direction, i.e. a valve having a Y-shaped configuration, is disclosed in U.S. Pat. No. 3,734,133. The outlets of the resilient-material valve are encompassed by pinching means adapted for periodically opening and closing the outlets. In a conceivable embodiment, the individual outlets can be controlled selectively, while in another possible embodiment the pinching means of the two outlets are connected to a common shaft, with one of the outlets being gradually opened, and the other outlet being gradually closed off, as the shaft undergoes rotation. The shaft can also be stopped in any desired position. The valve can be operated manually, hydraulically, or by means of a motor. One of the disadvantages of this technical solution is that it has a complex configuration, and it is also disadvantageous that the application of a resilient material necessitates the inclusion of additional reinforcing means to prevent damage, while the ageing of the resilient material also has to be taken into account. This technical solution is not suited for generating a pulsating water flow in the outlets.

In DE 30 40 051 A1 a vapour exhaust system comprising a Y-shaped valve is disclosed, wherein the valve is adapted for controlling the direction of the air flow. A rotor is disposed at the junction of the air conduits converging in a Y-shape, the rotor being adapted for fully closing off each of the air conduits, or in an intermediate state, for controlling the ratio of flow between the conduits. The disadvantage of the technical solution is that it can be applied only with a low-density medium (for example, air), and at low pressures, because in mediums with higher density (for example, water) or at higher pressures the movement of the rotor gets obstructed, i.e. it cannot be moved from one position to another. This technical solution is also not suited for generating pulsating flow.

The closest prior art of the invention is disclosed in U.S. Pat. No. 9,404,241 B1. In the document, a waste water diverter valve is disclosed that comprises a Y-shaped housing and a rotatable closing member (valve member) adapted for controlling water flow. By rotating the valve member, water is directed to exit either through one outlet port or through the other, with the valve member being adapted to be moved not only manually but also automatically, for example applying a solenoid or a motor. The disadvantage of this technical solution is that during switching there occurs an "intermediate" state wherein both outlet ports are closed off. In such a completely closed state the water flow is obstructed, which results in high forces required to perform the switching operation. Due to its field of application, this technical solution is also not suited for generating a pulsating flow at its outlets.

US 388,748, U.S. Pat. No. 6,289,913 B1, U.S. Pat. Nos. 5,320,141, 3,040,776 and 4,635,674 also disclose the general background art of water diverters and diverter valves.

DESCRIPTION OF THE INVENTION

In light of the known technical solutions the need has arisen for providing a water diverter apparatus that can be operated with low energy consumption and low pressure losses, and can be adapted for supplying water to the water inlet openings or nozzles in massage pools or tubs, where the nozzles actually supplied with water can be controlled, and where a pulsating water flow can be generated in the nozzles.

The object of the invention is to provide a water diverter apparatus that eliminates the drawbacks of prior art solutions to the greatest possible extent.

The primary object of the invention is to provide a water diverter apparatus wherein the distance travelled by the water is reduced, with the number of large-angle flow direction changes also being reduced.

Another objective of the invention is to provide a water diverter apparatus that has lower flow losses compared to prior art technical solutions, and, as a result of that, is energy- and cost-efficient.

A further objective of the invention is to provide a method that, applying the water diverter apparatus according to the invention, is adapted for generating a pulsating water flow at the outlet sections of the apparatus.

The objectives according to the invention have been fulfilled by providing the water diverter apparatus defined in claim 1 and the method defined in claim 10. Preferred embodiments of the invention are defined in the dependent claims.

The technical solution according to the invention has the advantage that, thanks to the Y-shaped arrangement and the specially configured directing member, it reduces the losses, for example pressure losses, resulting from the diversion of the water flow.

We have recognised that the total distance travelled by the water and the angle of direction changes can be reduced if direction diversion is not implemented by manual control but by applying motors, typically at the level of the motors located at the bottom of pools or tubs. Due to the shorter distance travelled by the water, and to the smaller-than-before angles of direction changes, water flow losses are significantly reduced, and thus the apparatus can be operated with lower energy consumption, and the flow can be maintained by applying lower pressure difference values.

We have also recognised that, by moving the flow diverter member transversely with respect to the direction of flow, lower forces are required for moving the diverter, and thereby the flow control member can be moved also in a greater-density medium, for example water, or in a medium with higher pressure, without the flow directing member "getting stuck" at one of its terminal positions. The flow direction can therefore be adjusted not only manually but also automatically. Automatic or remotely controlled adjustment is advantageous because direction diversions can be performed at any location, which also contributes to shortening the unnecessarily long flow path.

Another advantage of the invention is that the apparatus has simple configuration, and can be easily installed and maintained.

The advantages of the invention also include that the apparatus can be applied for generating a pulsating, variable-intensity fluid flow, which further improves user experience.

BRIEF DESCRIPTION OF THE DRAWINGS

Preferred embodiments of the invention are described below by way of example with reference to the following drawings, where.

MODES FOR CARRYING OUT THE INVENTION

Figure 1:
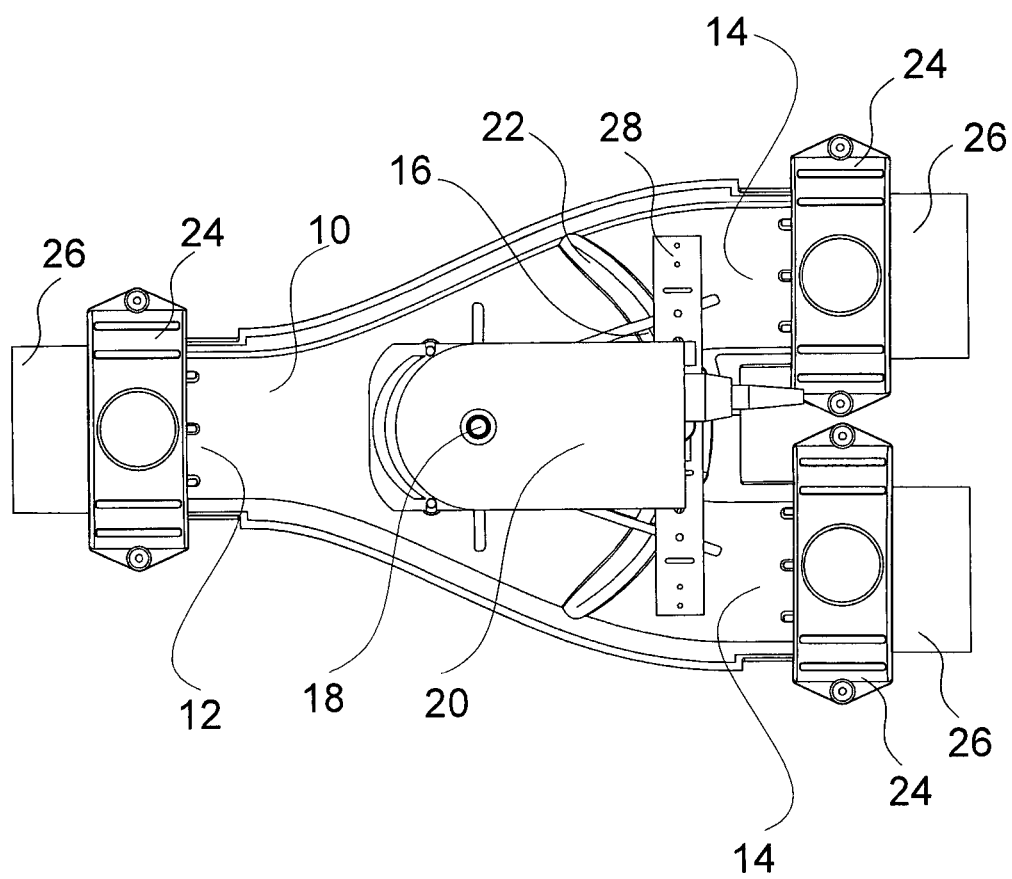
FIG. 1 is the top plan view of a preferred embodiment of the water diverter apparatus according to the invention.

FIG. 1 illustrates, in a top plan view, a preferred embodiment of the apparatus according to the invention. The water diverter apparatus comprises a housing 10 that has an inlet section 12 and two outlet sections 14. Water—that refers to fresh or salt water, as well as water containing additives such as air, essential oils, foam bath soap etc.—enters the apparatus via the inlet section 12 and leaves it through at least one of the outlet sections 14. The apparatus does not have a completely closed-off state, i.e. one of the outlet sections 14 is always in an at least partially open state. To reduce flow losses, the separation angle between the outlet sections 14 is less than 180°. Here, the term "separation angle" refers to the greatest angle between the tangents to the centrelines of the outlet sections 14.

To minimize flow losses as much as possible, in the preferred embodiment shown in FIG. 1 the inlet section 12 and both outlet sections 14 have their centrelines lying in the same flow plane, with the separation angle between the outlet sections 14 being less than 180°. In the preferred embodiment that can be seen in FIG. 1, the separation angle is approximately 50°, with the outlet sections 14 leading out of the apparatus nearly parallel to each other.

The apparatus may also comprise more than two outlet sections 14 with their centrelines lying in the same flow plane, or with their centrelines extending in arbitrary directions. If more than two outlet sections 14 are included, then the separation angle between any two outlet sections 14 is less than 180°.

The apparatus further comprises a shaft 18 supported in the housing 10, and a flow directing member that can be positionally adjusted by rotation about the shaft 18. In the preferred embodiment according to FIG. 1 the shaft 18 is arranged perpendicular to the flow plane, in the bisector plane of the separation angle. The shaft 18 has a preferably direct or indirect connection to a motor 20, and in the preferred embodiment according to FIG. 1 the shaft 18 is driven by a motor 20, preferably an electric motor, connected to the apparatus. The shaft 18 can also be driven by a Bowden cable or a manually operated rod system.

The flow directing member is implemented as a closing member 16 arranged downstream of the shaft 18, the closing member 16 being connected with the shaft 18 via a spacer 17, and having a closing surface arranged transversely to the flow direction. The closing member 16 has three particular positions. In a first position, one of the outlet sections 14 is closed off by the closing member 16, while in a second position it closes off the other outlet section 14. In a third position, the closing member 16 is in a position between the first and second positions, and in this position the closing member 16 allows water to flow into both outlet sections 14. By moving the closing member 16 from one of the three positions to another the fluid flow rate in the outlet sections 14 can be adjusted by modifying the area of the flow cross section.

The closing member 16 and the shaft 18 are interconnected by a spacer 17 and a sleeve 15 that is attached to the spacer 17 and encompasses the shaft 18. The spacer 17 is preferably configured as a flat or rod-like member that is arranged parallel to the flow direction of the water such that it affects the water flow to as small an extent as possible. The interconnected sleeve 15 and spacer 17, or the spacer 17 and the closing member 16, or even all three components can be preferably formed as one integral element, for example by injection moulding. In order to ensure that the shaft 18 cannot be turned without the closing member 16, the shaft 18 and the sleeve 15 are interconnected such that they can only move together; in the preferred embodiment according to FIG. 1 the shaft 18 and the sleeve 15 are interconnected by a pin 30.

The direction of displacement of the closing surface of the closing member 16 is transversal to the flow direction of the medium, i.e. the closing member 16 undergoes a latch-like movement, as a result of which no such forces arise (even in a high-pressure and/or high-density medium) that would cause the closing surface 16 to get stuck in either of the distinctive positions.

A groove 22 is formed on an inner surface of the housing 10, along a trajectory of a peripheral edge of the closing surface of the closing member 16. The closing member 16 preferably has a cylindrical or a spherical closing surface, in which case the groove 22 formed on the inner surface of the housing 10 also corresponds to a cylindrical or a spherical shape, respectively. In the preferred embodiment wherein the outlet sections 14 lie in the same flow plane, the closing surface of the closing member 16 is preferably cylindrical. In another preferred embodiment, wherein the outlet sections 14 do not lie in the same flow plane, the closing surface of the closing member 16 is preferably spherical.

In the first and/or second position of the closing member 16 the corresponding outlet sections 14 are closed off by the cooperation of the closing member 16 and the groove 22. The closing member 16 is not seated against the wall of the groove 22, and thus the closing member 16 can be prevented from becoming stuck in the groove 22. The closing member 16 and the groove 22 together form a labyrinth seal having a shape that increases the fluid resistance of the water. Due to the increased resistance the water flow rate is significantly reduced between the closing member 16 and the groove 22, while preferably one of the outlet sections 14 is brought into a closed state, and still more preferably, in the first and/or in the second position the nearly complete (near-100%) closure of the corresponding outlet section 14 is realized, in a leak-proof manner, even though complete fluid-tightness is not a requirement based on the application field of the apparatus.

To reduce manufacturing costs and also for easier installation and maintenance, the housing 10 consists of at least two portions, preferably two portions arranged symmetrically with respect to the flow plane, more preferably two congruent portions arranged symmetrically with respect to the flow plane.

For connecting water pipelines to the apparatus, a threaded extension piece 26 is attached to a terminal edge of the inlet section 12 and/or at least one of the outlet sections 14 by a threaded nut 24. Like the housing 10, the threaded nut 24 also consists of two portions arranged symmetrically with respect to the flow plane in the preferred embodiment according to FIG. 1, the two portions of the threaded nut 24 being interconnected by screws situated perpendicular to the flow plane.

In the preferred embodiment according to FIG. 1, a plate 28 comprising bores is attached to the housing 10, and the plate 28 is adapted for fixing the motor 20. The bores disposed in the plate 28 assist the positioning of the motor 20. The motor 20 can preferably be controlled remotely, preferably by press buttons disposed beside the pool, tub or other installation location. Upon pressing a button, the shaft 18 and the closing member 16 connected thereto are moved by the motor 20 to a position corresponding to one of the above mentioned three positions. The press buttons can also be applied for setting up an automatic control regime, in which case the closing member 16 is brought periodically into the various positions by the motor 20 such that a periodically changing, pulsating water flow is produced in the outlet sections 14, which contributes to the application of the apparatus for massaging.

Table 1 illustrates an exemplary cycle of the automatic control regime. When the apparatus is started, the closing member 16 is in the first position, i.e. water can leave the apparatus only through one of the outlet sections 14. As the closing member 16 is rotated, the apparatus passes through the third position and is switched into the second position, where it stays fixed for example for five seconds, while the water flows out through the other outlet section 14. In this example, after ten seconds have elapsed, the closing member 16 gradually returns from the second position (through the third position) into the first position, wherein it also stays fixed for five seconds. The entire cycle is then repeated. Due to the slow switching between the first and second positions, the water flow rate increases and decreases in a gradual manner in the outlet sections 14.

TABLE 1

An exemplary cycle of the automatic control regime

| duration (s) | position |
|---|---|
| 0.0-2.5 | position 1 → position 3 |
| 2.5-5.0 | position 3 → position 2 |
| 5.0-10.0 | position 2 |
| 10.0-12.5 | position 2 → position 3 |
| 12.5-15.0 | position 3 → position 1 |
| 15.0-20.0 | position 1 |

To determine the pressure losses of the preferred embodiment of water diverter apparatus shown in FIG. 1, flow simulations have been performed, and the results were compared with the pressure loss results obtained with a water diverter having a T-shape, and with a straight, non-branching tube section that can be regarded as an ideal flow tube. The simulations of the water diverter apparatus were carried out in the closed state of one of the outlet sections 14 (first or second position), and also in the state wherein both outlet sections 14 are open (third position). In the simulations, the cross-sectional area of the inlet section 12 and the outlet sections 14 was identical, in accordance with FIG. 1, and for the T-shaped water diverter and for the ideal flow tube also the cross-sectional area values of the water diverter according to the invention were applied.

All of the simulations were performed under the same boundary conditions, i.e. at an absolute pressure of 1.3 bar (~130 kPa) in the inlet sections 12, and a volumetric flow of 625 l/min (0.0104 m$^3$/s) in the outlet sections 14. The simulation results are presented below in Table 2.

In the case of the simulations related to the "closed" case (column 2 of Table 2) the water diverter apparatus according to FIG. 1 is in the first or second position, i.e. one of the outlet sections 14 is in the closed-off state. In the case of a water diverted with a T-shaped pipe, one of the outlets is closed off, so the water is diverted in a 90-degree angle. In the ideal flow tube, water flows at a constant cross section, without being diverted.

In the case of the simulations related to the "open" case (column 3 of Table 2), both outlet sections 14 of the water diverter apparatus according to FIG. 1 are open (third position). In a corresponding simulation, both outlets of the T-shaped water diverter are also open, and the ideal case being modelled by applying a flow tube having an initial cross-sectional area that is identical to the cross-sectional area of the inlet section 12, and a terminal cross-sectional area that is twice the initial one, i.e. the sum of the cross-sectional area values of the outlet sections 14, with the cross-sectional area of the pipe increasing uniformly between the beginning to the end of the tube (a so-called diffuser).

TABLE 2

Summary of the simulation results

| | "open" case | "closed" case |
|---|---|---|
| water diverter apparatus according to FIG. 1 | ΔP = 2370 Pa | ΔP = 2216 Pa |
| T-shaped water diverter apparatus | ΔP = 8536 Pa | ΔP = 8290 Pa |
| ideal flow tube | ΔP = 1392 Pa | ΔP = 1855 Pa |

As it can be clearly seen from the results included in Table 2, the water diverter apparatus having the preferred configuration of FIG. 1 operates with a pressure loss that is approximately one-fifth of the loss of water diverters having a T-shape, and thus the pressure conditions during the operation of the water diverter apparatus according to the invention much better approximate the conditions occurring in an ideal flow tube, so the water diverter according to the invention can be operated more economically compared to existing technical solutions. Thanks to the pressure loss difference of 154 Pa between the positions of the water diverter according to the invention, no large forces occur when the water flow direction is changed, so the apparatus can be reliably operated for a prolonged period of time, while the closing member 16 can be moved by applying a low force such that it will not get stuck in any position.

Figure 2:
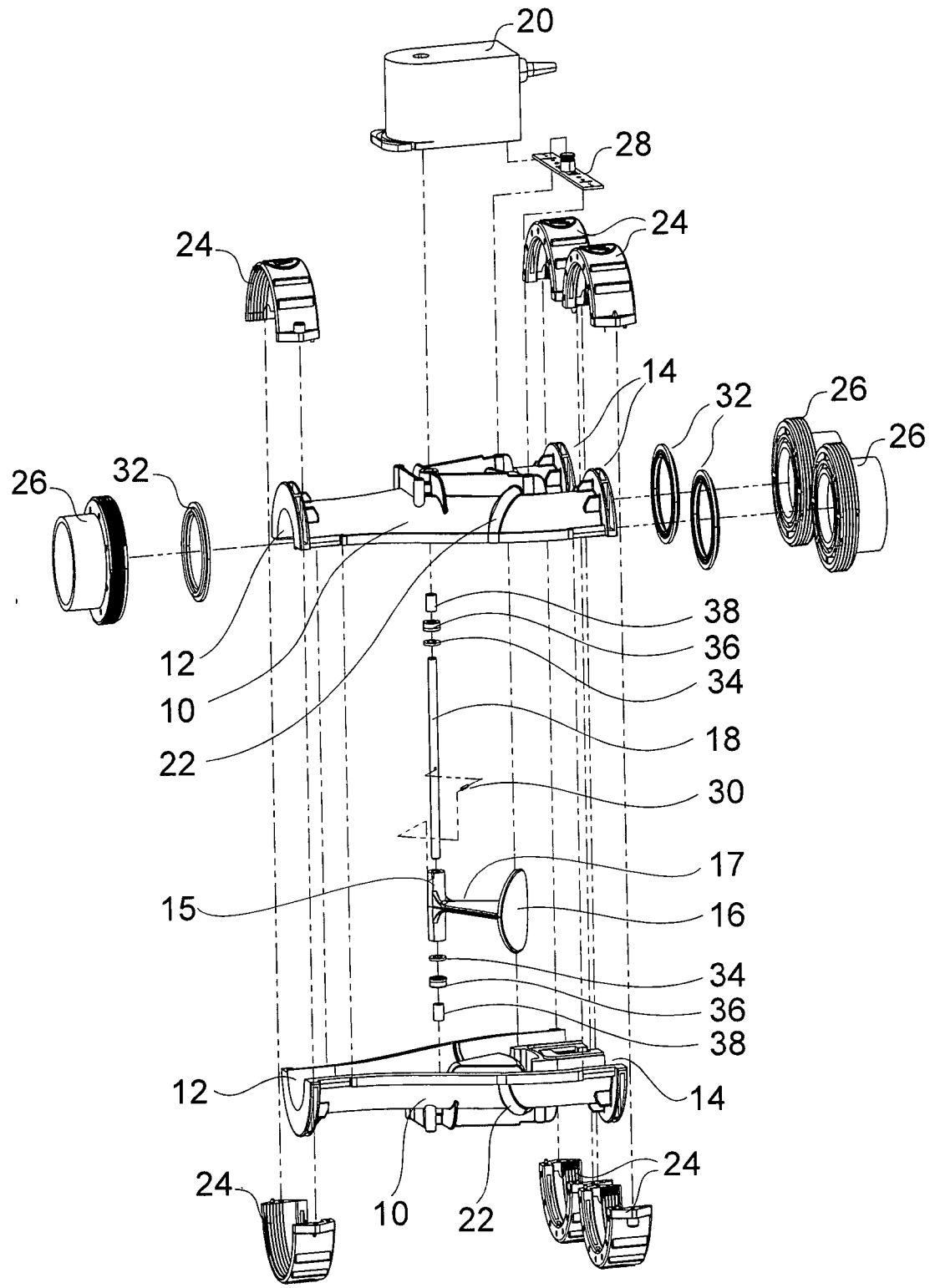
FIG. 2 is an exploded drawing of the preferred embodiment shown in FIG. 1.

FIG. 2 is the exploded view of a preferred embodiment of the water diverter apparatus shown in FIG. 1. In the preferred embodiment shown in the figure, the housing 10 consists of two congruent components, more preferably of two identical components, which on the one hand allows for easier assembly and maintenance, and on the other hand reduces manufacturing costs.

In the exploded view of FIG. 2, the preferred configuration of the threaded extension piece 26 connected to the inlet section 12 and to the outlet sections 14 of the housing 10, and the preferred configuration of the threaded nut 24 adapted to attach the threaded extension piece 26 can be seen in more detail. As with the housing 10, each of the threaded nuts 24 consists of two congruent parts interconnected by screws situated perpendicular to the flow plane. The leak-proof interconnection of the housing 10 and the extension piece 26 is preferably provided by a first seal 32 interposed therebetween. The first seal 32 is preferably made of silicone material.

In FIG. 2, a preferred configuration of the closing member 16 arranged in the housing 10, and of the shaft 18 adapted to move the closing member 16 is presented in more detail than in FIG. 1. In the embodiment according to the figure, the closing member 16, the spacer 17, and the sleeve 15 are implemented as a single integral component, with the sleeve 15 being affixed to the shaft 18 by a pin 30, preventing the shaft 18 from being rotated without the closing member 16. For securing together the shaft 18, the closing member 16, and the sleeve 15, any suitable technical solution known from the prior art can be applied, and the components can optionally also be made as a single piece.

In FIG. 2, the configuration of the closing surface of the closing member 16 can also be seen in more detail. In the preferred embodiment according to the figure, the closing member 16 is formed along a cylinder wall, with the closing surface fitting into the groove 22 formed on the inner surface of the housing 10, thereby providing for a near-100% closure in the outlet sections 14 in the first and second positions of the closing member 16.

The shaft 18 is arranged to preferably have a connection to a motor 20, which connection preferably comprises an spacer ring 34, a second seal 36, and a bearing 38. The spacer ring 34 is adapted to reduce the loads on the bearing 38. Its inclusion allows for reducing the loads placed on the bearing 38 by the movement of the closing member 16. In the preferred embodiment shown in FIG. 2, a respective spacer ring 34, second seal 36, and bearing 38 is disposed on both sides of the shaft 18.

Figures 3A, 3B, 3C:
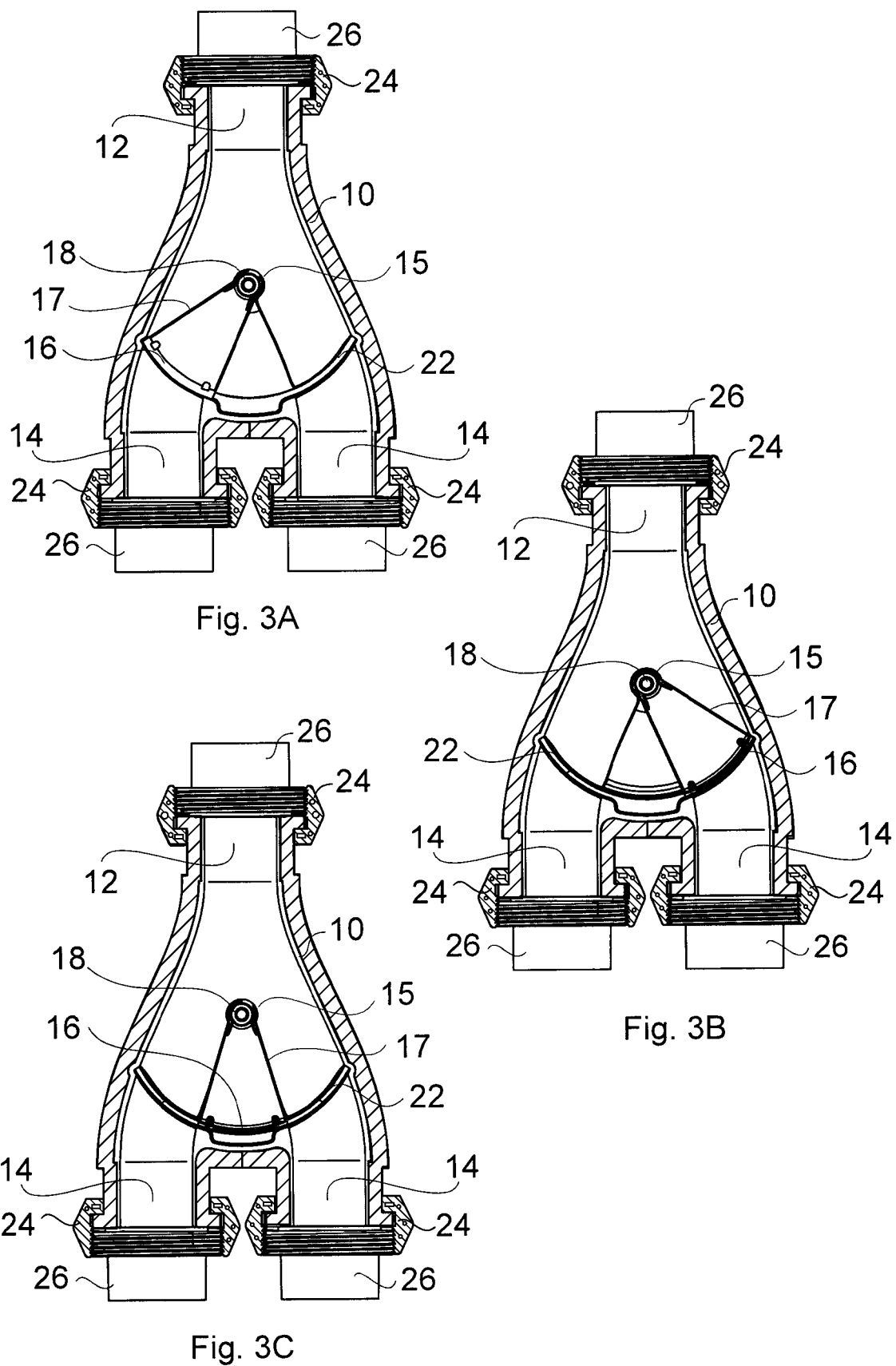
FIG. 3A is the sectional view of the preferred embodiment shown in FIG. 1, taken in one of the terminal positions of the flow directing member, where one of the outlets is in a closed state.
FIG. 3B is the sectional view of the preferred embodiment shown in FIG. 1, taken in another terminal position of the flow directing member, where the other outlet is in a closed state.
FIG. 3C is the sectional view of the preferred embodiment shown in FIG. 1, taken in an intermediate position of the flow directing member, with both outlets being open.

FIGS. 3A, 3B, and 3C show cross sectional views, taken along the flow plane, of the preferred embodiment of FIG. 1 in various positions of the closing member 16. In FIG. 3A the first position of the closing member 16 is illustrated, wherein the left-side outlet section 14 is closed off, only allowing the medium to exit the apparatus through the right-side outlet section 14. FIG. 3B illustrates the second position of the closing member 16, wherein the right-side outlet section 14 is closed off, and the medium is allowed to exit the apparatus through the entire cross section of the left-side outlet section 14. FIG. 3C shown the third position of the closing member 16, wherein both outlet sections 14 are open. During the movement of the closing member 16 there occur such transient states wherein the entire cross-section of one of the outlet sections 14 is open, while the flow section of the other outlet section 14 is only partially open.

During the operation of the apparatus according to the invention, the closing member 16 of the water diverter apparatus is moved into the positions described above in relation to FIG. 1 by rotating the shaft 18. The shaft 18 is preferably directly, or indirectly—for example via a Bowden cable—connected to a motor 20. The motor 20 is adapted for controlling water flow by moving the closing member 16 between the first and second positions, such that a flow with a slowly increasing or decreasing flow rate, or alternatively, a pulsating flow is generated inside the outlet sections 14.

The manner of industrial application of the invention follows from the characteristics of the technical solution described above. As can be seen from the above, the invention fulfils its objectives in a very preferable manner compared to the prior art. The invention is, of course, not limited to the preferred embodiments described in details above, but further variants, modifications and developments are possible within the scope of protection determined by the claims, for example variants including three or more outlet sections.

LEGENDS 10 housing
12 inlet section
14 outlet section
15 sleeve
16 closing member
17 spacer
18 shaft
20 motor
22 groove
24 (threaded) nut
26 (threaded) extension piece
28 plate
30 pin
32 (first) seal
34 spacer ring
36 (second) seal
38 bearing

The invention claimed is:
1. A water diverter apparatus comprising
a housing (10) having an inlet section (12) and two outlet sections (14), with a separation angle of less than 180° between the outlet sections (14), and
a flow directing member that can be adjusted by rotation about a shaft (18) supported in the housing (10),
characterised in that
the flow directing member is a closing member (16) arranged downstream of the shaft (18), the closing member (16) being connected with the shaft (18) via a spacer (17) and having a closing surface arranged transversely to a flow direction, the closing member

(16) having a first position adapted to close one of the outlet sections (14), a second position adapted to close the other outlet section (14), and a third position between the first and the second positions, adapted to allow water to flow into both outlet sections (14) in their entire cross-sections, wherein the closing member (16) is arranged downstream of the shaft (18) in all of the first, second and third positions, and the water diverter apparatus further comprising a motor (20) connected directly or indirectly to the shaft (18), wherein the motor (20) is adapted for generating a pulsating water flow in the outlet sections (14) by moving in periodically alternating manner the closing member (16) into the first and into the second positions.

2. The apparatus according to claim 1, characterised in that the shaft (18) is arranged perpendicular to the flow plane in the bisector plane of the separation angle at a separation of the outlet sections (14).

3. The apparatus according to claim 1, characterised in that the closing member (16) has a cylindrical or a spherical closing surface.

4. The apparatus according to claim 3, characterised in that a groove (22) is formed on an inner surface of the housing (10), along a trajectory of a peripheral edge of the closing surface of the closing member (16), wherein the closing member (16) and the groove (22) together form a labyrinth seal.

5. The apparatus according to claim 1, characterised in that the spacer (17) is formed as a flat or rod-like member arranged parallel to the flow direction of the water.

6. The apparatus according to claim 1, characterised in that the inlet section (12) and the outlet sections (14) have their respective centrelines arranged in a common flow plane.

7. The apparatus according to claim 1, characterised in that the housing (10) consists of at least two portions, preferably of two portions arranged symmetrically with respect to the flow plane, more preferably two congruent portions arranged symmetrically with respect to the flow plane.

8. The apparatus according to claim 1, characterised in that a threaded extension piece (26) adapted to be connected to a water pipeline is attached via a threaded nut (24) to a terminal edge of the inlet section (12) and/or to a terminal edge of at least one of the outlet sections (14).

9. A method for operating a water diverter apparatus comprising an inlet section (12) and two outlet sections (14), characterised by using a water diverter apparatus according to claim 1, moving the closing member (16) in its various positions by rotating the shaft (18) and generating a pulsating water flow in the outlet sections (14) by moving, in a periodically alternating manner, the closing member (16) into the first and into the second positions by controlling a motor (20) directly or indirectly connected to the shaft (18).

* * * * *